United States Patent [19]

Nakazato et al.

[11] Patent Number: 4,890,167

[45] Date of Patent: Dec. 26, 1989

[54] APPARATUS FOR PROCESSING IMAGE SIGNAL

[75] Inventors: Katsuo Nakazato, Tokyo; Hiroyoshi Tsuchiya, Kawasaki; Toshiharu Kurosawa, Yokohama; Yuji Maruyama, Tokyo; Kiyoshi Takahashi, Kawasaki, all of Japan

[73] Assignee: Matsushita Electric Industrial Co., Ltd., Osaka, Japan

[21] Appl. No.: 110,082

[22] Filed: Oct. 16, 1987

[30] Foreign Application Priority Data

Oct. 17, 1986 [JP] Japan ............................ 61-247755
Oct. 17, 1986 [JP] Japan ............................ 61-247756
Oct. 17, 1986 [JP] Japan ............................ 61-247761
Dec. 19, 1986 [JP] Japan ............................ 61-304245

[51] Int. Cl.$^4$ .............................................. H04N 1/40
[52] U.S. Cl. ................................... 358/443; 358/464
[58] Field of Search ............... 358/282, 283, 284, 903, 358/280

[56] References Cited

U.S. PATENT DOCUMENTS

| 4,339,774 | 7/1982 | Temple | 358/283 |
| 4,449,150 | 5/1984 | Kato . | |
| 4,654,721 | 3/1987 | Goertzel et al. | 358/283 |
| 4,692,811 | 9/1987 | Tsuchiya et al. | 358/283 |

FOREIGN PATENT DOCUMENTS

| 0046665 | 3/1985 | Japan | 358/283 |
| 0005677 | 1/1986 | Japan | 358/283 |

OTHER PUBLICATIONS

"An Adaptive Algorithm for Spatial Grey Scale", by Robert Floyd & Louis Steinberg; SID 75 DIGEST, p. 36.

Primary Examiner—James J. Groody
Assistant Examiner—David E. Harvey
Attorney, Agent, or Firm—Lowe, Price, LeBlanc, Becker & Shur

[57] ABSTRACT

An image signal processing circuit for converting a continuous tone image signal to a bi-level image signal, for producing a spatial gray scale image on a bi-level display device such as a gas plasma display panel. Respective values of apportionment factors ($K_A$ to $K_D$) used for apportioning a bi-level conversion error of each picture element of the image among a plurality of picture elements (A to D) positioned peripherally adjacent thereto are periodically altered, in a periodic or random succession of values, to thereby effectively eliminate the generation of a texture pattern in display regions corresponding to areas of uniform density in the original image.

13 Claims, 5 Drawing Sheets

APPARATUS FOR PROCESSING IMAGE SIGNAL

BACKGROUND OF THE INVENTION

A requirement has arisen in recent years for high-quality reproduction of both printed images and continuous tone images by utilizing certain types of display device, such as a gas plasma display, which are inherently capable of generating only two levels of display density. This is achieved by generating a spatial gray scale display image. However problems are presented by the prior art methods proposed for implementing such reproduction.

WIth such a bi-level display device, each picture element generated by the display can be set (e.g. as an element of a dot matrix) in either a bright or a dark state. There have been various proposals for implementing pseudo-continuous tone reproduction by such display devices by employing a spatial gray scale. These methods are based on setting a relatively high proportion of picture elements of the display in the light state to represent a light-density region of the original image, and a high proportion in the dark state in the case of a region of the image which should appear dark.

The most well-known method of providing such pseudo-continuous tone reproduction is the dither technique. With this method, a continuous tone image is reproduced on the basis of numbers of dots within each of predetermined areas of the continuous tone image, and utilizes a dither matrix. Threshold values of the dither matrix are compared with the level of an input signal, one picture element at a time, to thereby execute bi-level image conversion processing. However this method has the disadvantage that the continuous tone characteristic and the resolution of the image that is obtained will depend directly upon the size of the dither matrix, and have a mutually incompatible relationship. Moreover with the dither technique, it is difficult to avoid the generation of moire patterns, particularly when printed images are reproduced.

A method has been proposed in the prior art which is highly effective in overcoming the problems of the dither method, i.e. reducing the incompatibility between a good continuous tone characteristic and high resolution, and suppressing the generation of moire patterns. The method is called the error diffusion method, which has been proposed by R. Floyd and L. Steinberg under the title "An Adaptive Algorithm for Spatial Gray Scale", published in the SID 75 Digest, pp 36-37. The basic principles of the proposed method are as follows. To determine whether a picture element of the input signal is to be displayed at the dark or at the light level, the corresponding level of the input image signal is compared with a threshold value and a light/dark decision thereby made. The density of a picture element of the display will in general be in error with relation to the desired density of that element, i.e. the density of the corresponding picture element in the original continuous tone image. This error is referred to in the following as the bi-level conversion error. However the effect of this error are substantially reduced by subsequently modifying the respective values of desired density of a set of picture elements which are positioned peripherally adjacent to the object picture element.

With the method proposed by Floyd and Steinberg, the effects of the bi-level conversion error of each picture element are substantially reduced by modifying the respective desired densities of a set of picture elements which are positioned peripherally adjacent to that picture element, the modification being performed by apportioning the the value of error obtained for that object picture element among these peripheral picture elements, with the error being apportioned in accordance with predetermined fixed factors. Such factors are referred to in the following as apportionment factors.

The error diffusion method is superior to the dither method, with regard to image resolution and continuous tone characteristic, and enables the degree of generation of moire patterns to be made very small, even when a printed image is being reproduced. However in the case of reproduction of an image which has only small amounts of changes in density, and computer-generated images which have areas of extremely uniform density, the error diffusion method produces regions of texture in the reproduced image, with this texture being specific to the error diffusion method. For this reason, the error diffusion method has not been widely adopted. The reason for generation of this texture is that a fixed relationship is continuously maintained between an object picture element and the aforementioned set of picture elements which are disposed peripherally adjacent to the object picture element, and fixed values are also maintained for the respective proportions by which the bi-level conversion error of the object picture element is apportioned among these peripheral picture elements.

The term "object picture element" as used herein has the significance of a picture element which is currently being processed, to determine a corresponding bi-level display image value, with data being utilized in that processing which have been obtained beforehand during processing of preceding picture elements.

SUMMARY OF THE INVENTION

The present invention provides an image signal processing apparatus which prevents generation of a texture such as that produced by the error diffusion method described above, and which also provides an excellent continuous tone characteristic and high resolution, with only a very small degree of moire pattern being produced even when a printed image or an image containing regions of highly uniform density is being reproduced.

In order to attain the above objectives, an image signal processing apparatus according to the present invention samples an input signal representing a continuous tone image, in units of picture elements, to produce a bi-level image signal, and comprises:

error memory means for storing accumulated errors at storage positions respectively corresponding to image positions of an object picture element and a plurality of picture elements which have not yet been processed and are positioned adjacent to the periphery of said object picture element;

input correction means for adding a level of said input signal, representing the density of said object picture element in said image, to an accumulated error which has been stored during a preceding processing step at said position within said error memory means corresponding to said object picture element, to derive a corrected level as a result of said addition;

bi-level conversion means for comparing said corrected level with a predetermined threshold value to thereby determine a bi-level value for said object picture element, and for outputting said bi-level value as said bi-level image signal;

difference computation means for deriving a bi-level conversion error which is the difference between said corrected level and said bi-level value determined for said object picture element;

apportionment factor generating means containing stored therein a plurality of predetermined apportionment factor, for generating a plurality of apportionment factors for apportioning said bi-level conversion error among said plurality of picture elements disposed peripherally adjacent to said object picture element and;

error apportionment and updating means for computing respective error apportionment values corresponding to said peripherally adjacent picture elements, based on said bi-level conversion error for said object picture element and said plurality of apportionment factors, adding said said error apportionment values to corresponding accumulated errors which have been previously stored in said error memory means at predetermined storage positions corresponding to said peripherally adjacent picture elements, to thereby product updated accumulated errors, and storing said updated accumulated errors in said error memory means.

The following five configurations can be utilized to implement the aforementioned apportionment factor generating means.

Firstly, the apportionment factor generating means can comprise means which function to alter a correspondence between respective picture element positions and a set of apportionment factors for the plurality of picture elements which have not yet been processed and are positioned at the periphery of the object picture element, with the alteration being executed periodically with a predetermined alteration period.

Secondly, the apportionment factor generating means can comprise means which function to generate apportionment factors for the a plurality of picture elements which have not yet been processed and are positioned at the periphery of the object picture element, by executing selection of apportionment factors from a plurality of sets of apportionment factors, said selection being executed at intervals having a predetermined alteration period.

Thirdly, the apportionment factor generating means can comprise means which function to generate apportionment factors for the plurality of picture elements which have not yet been processed and are positioned at the periphery of the object picture element, by randomly selecting the apportionment factors from a plurality of sets of apportionment factors, the selection being performed periodically with a predetermined alteration period.

Fourthly, the apportionment factor generating means can comprise means which function to generate apportionment factors for the plurality of picture elements which have not yet been processed and are positioned at the periphery of the object picture element, by randomly establishing correspondences between these peripheral picture elements and apportionment factors of a single set of apportionment factors.

Fifthly, the apportionment factor generating means can comprise means which function to generate apportionment factors for the plurality of picture elements which have not yet been processed and are positioned at the periphery of the object picture element, by randomly selecting these apportionment factors from among a plurality of sets of apportionment factors, with the random selecting being executed in accordance with random number generation which is initialized once in each occurrence of an arbitrary number of successive scanning lines.

DESCRIPTION OF THE PREFERRED EMBODIMENTS

Figure 1:
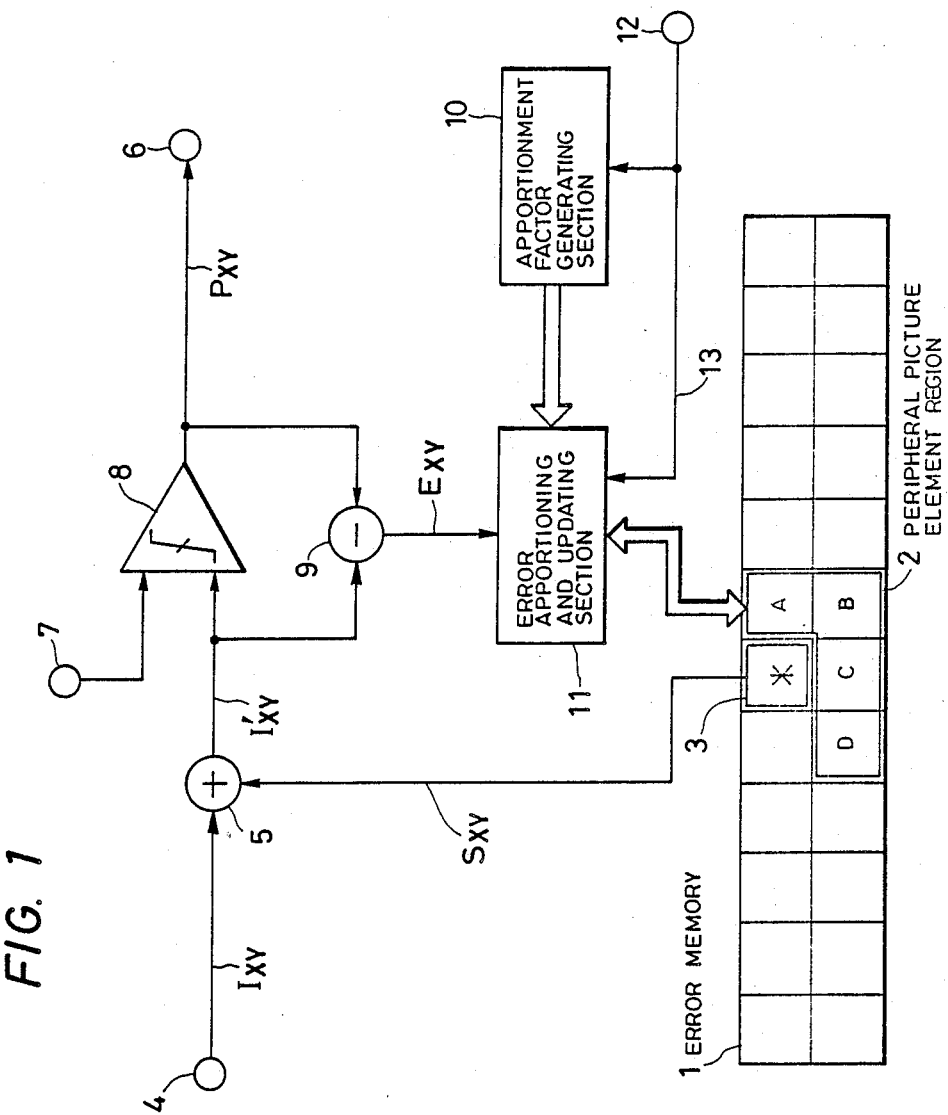
FIG. 1 is a conceptual block diagram of an embodiment of an image signal processing apparatus according to the present invention.

FIG. 1 is a conceptual block diagram showing the essential components of a first embodiment of an image signal processing apparatus according to the present invention. In FIG. 1, the display coordinates of an object picture element (i.e. a picture element for which image processing is currently being executed, as defined hereinabove) are designated as (x,y). Reference numeral 1 denotes an error memory, and numeral 2 denotes a storage region of error memory 1 which correspond to a region of the image to be processed containing a plurality of picture elements that have not yet been processed and are positioned at adjacent to the periphery of the object picture element. Positions within this region 2 can be expressed in terms of an error apportionment factor matrix. Numeral 3 denotes a position within the error memory 1 in which has been stored an accumulated error $S_{xy}$ for the object picture element having coordinates (x,y), as indicated by the "*" symbol. Numeral 4 denotes an input terminal coupled to receive an input image signal. A level $I_{xy}$ of this input signal representing a desired value of display density for the object picture element having coordinates (x,y). Numeral 5 denotes an adder which amends the input signal level $I_{xy}$ by adding thereto the accumulated error $S_{xy}$ (previously derived and stored as described hereinafter) to produce a corrected input level $I'_{xy}$, i.e. $I'_{xy} = I_{xy} + S_{xy}$. Numeral 6 denotes an output terminal from which a bi-level output value $P_{xy}$ corresponding to the input level $I_{xy}$ is produced as an output signal, i.e. a bi-level image signal, either at a level designated as the R level or at 0 level. Numeral 7 denotes a terminal to which is applied a threshold level, for example a fixed threshold value of R/2, and 8 denotes a device such as a comparator, for executing bi-level conversion of the input level $I'_{xy}$ by comparing the level $I'_{xy}$ with the fixed threshold value R/2, to produce as output a bi-level value $P_{xy}$ at the R level if $I'_{xy} > R/2$, and otherwise producing $P_{xy}$ at the 0 level. Numeral 9 denotes a subtractor, for computing a difference between the input level $I'_{xy}$ and the output bi-level value $P_{xy}$ to thereby derive a bi-level conversion error $E_{xy}$ (i.e. $E_{xy} = I'_{xy} - P_{xy}$) for the object picture element. Numeral 10 denotes an apportionment factor generating section for generating apportionment factors for apportioning the bi-level error $E_{xy}$ among the peripherally adjacent picture elements in region 2. Numeral 11 denotes an error apportionment and updating section for computing error apportionment values corresponding to the picture elements which have not yet been processed and are positioned at the periphery of the object picture element, (these error apportionment values being computed based on a plurality of apportionment factors produced from the apportionment factor generating section 10 and the bi-level error $E_{xy}$ for the object picture element) and for adding these error apportionment values to respective values of accumulated error for the set of peripheral picture elements A to D of the region 2, these accumulated error values having been derived during preceding similarly executed processing steps for other picture elements and stored at corresponding positions within the error memory 1. The results of these additions, which constitute a set of updated accumulated errors, are then stored by the error apportioning and updating section 11 in the error memory 1, to be utilized in succeeding picture element processing steps. Numeral 12 denotes a sync signal input terminal from which a sync signal 13 is applied to control the timing of operations by the apportioning factor generating section 10 and the error apportioning and updating section 11, e.g. to determine the period between successive picture element processing steps.

The apparatus of FIG. 1, in effect, functions to periodically sample the input image signal applied to terminal 4, to obtain a level value $I_{xy}$ of that signal which represents the density of a picture element of the original image, and to convert that level $I_{xy}$ to a corresponding bi-level output value $P_{xy}$. The picture elements which are sampled in this way extend along successive (horizontal) lines of the display image, i.e. the x-direction, and a sync signal whose period determines the period of these conversions along the x-direction will be referred to in the following as the x-sync signal. The successive lines of picture elements which are displayed will be referred to as scanning lines. These are periodically selected along the y-direction (i.e. vertical direction) of the display, for processing, and a sync signal whose period corresponds to the period between successive scanning lines will be referred to in the following as the y-sync signal.

With the embodiment of FIG. 1, the x-sync signal is applied as sync signal 13 to control the operation of both the apportionment factor generating section 10 and the error apportionment and updating section 11. However it would be equally possible to operate the apportionment factor generating section 10 based on the y-sync signal rather than the x-sync signal.

It should be noted that the present invention is not limited to the application of a fixed threshold value to the signal terminal 7, and that it would be equally possible to apply to that terminal an arbitrary signal such as a signal representing a different image from that being processed, and to thereby execute control of the output image signal produced by the apparatus, on the basis of the signal thus applied to terminal 7.

With the apparatus having the configuration set out above, the accumulated error $S_{xy}$ for the object picture element is obtained on the basis of the following equation:

$$S_{xy} = K_{ij} \cdot E_{x-j+2, u-i+1} \quad (1)$$

In the above, i and j are coordinates expressed within the error apportionment factor matrix, while the error apportionment factor $K_{ij}$ expresses weighting values for apportionment of the error $E_{xy}$ of among a predetermined plurality of peripheral picture elements positioned adjacent to the object picture element, as described hereinabove.

The above computation is executed by the error apportioning and updating section 11, which then apportions the bi-level conversion error $E_{xy}$ among the respective unprocessed picture elements A to D of the region 2 in accordance with the respective apportionment factors for these picture elements which are produced by the apportionment factor generating section 10, and performs updating, by addition processing, of respective amounts of accumulated error for each of these picture elements.

The apportionment factor generating section 10 functions on the basis of one or more predetermined sets of apportionment factors, and operate sin synchronism with the x-sync signal 13 applied from input terminal 12. The apportionment factor generating section 10 functions to generate a set of apportionment factors KA to KD for apportioning the bi-level conversion error $E_{xy}$ among the plurality of picture element positions A to D within the peripheral picture element region 2, and supplies these apportionment factors to the error apportioning and updating section 11. The error apportioning and updating section 11 operates in synchronism with the sync signal 13 to execute processing utilizing these apportionment factors KA to KD, the bi-level conversion error $E_{xy}$ of the object picture element (produced from the subtractor 9), and a set of accumulated errors $S'_A$, $S'_C$ and $S'_D$ (which have been generated and stored in previously executed image processing operations), by reading out these accumulated errors from respective predetermined storage locations within the error memory 1 which respectively correspond to the picture element positions A, C and D of the peripheral region 2. This processing includes multiplication and addition processing, and serves to derive a set of updated accumulated errors $S_A$ to $S_D$ which respectively correspond to the picture element positions A, C and D of the peripheral region 2. The computation processing executed for this purpose is in accordance with the following equations:

$$S_A = S'_A + K_A \times E_{xy}$$

$$S_B = K_B \times E_{xy} \quad (3)$$

$$S_C = S'_C = K_C \times E_{xy} \quad (3)$$

$$S_D = S'_D + K_D \times E_{xy}$$

Updating processing is then executed by the error apportioning and updating section 11, by storing the new values of the accumulated errors $S_A$ to $S_D$ at locations in the error memory 1 which respectively correspond to the picture element positions A to D. These updated values of accumulated errors are subsequently utilized in processing succeeding picture elements, in the same way as described above.

This completes a step of image processing whereby the bi-level value $P_{xy}$ for the picture element 3 shown in FIG. 1 is generated and accumulated error updating performed for peripherally adjacent picture elements A, B, C and D of picture element 3. In the succeeding stage of image processing, the processing described above is again executed, to obtain a bi-level output value $P_{xy}$ for the next picture element (i.e. that indicated as A, in FIG. 1), utilizing the accumulated error $S_A$ which was derived and stored as described above, as the new value of accumulated error $S_{xy}$, and with new values of accumulated error being derived and stored for a set of picture elements in a new region 2 disposed peripherally adjacent to that picture element A (i.e. including picture elements C and B).

In the following, descriptions will be given of four other embodiments of the present invention. The principles of operation of each of these other embodiments are basically similar to those of the embodiment of FIG. 1, and the operation and components relating to application of the accumulated error $S_{xy}$ and the bi-level conversion error $E_{xy}$ are identical to those of the embodiment of FIG. 1. For that reason, only the operation of the apportionment factor generating section 10 and the error apportioning and updating section 11, in conjunction with the error memory 1, will be described in detail for each of these embodiments.

It should be noted that each of the configurations for the apportionment factor generating section 10 respectively described for the following embodiments is equally applicable to the first embodiment of FIG. 1 described above.

Figure 2:
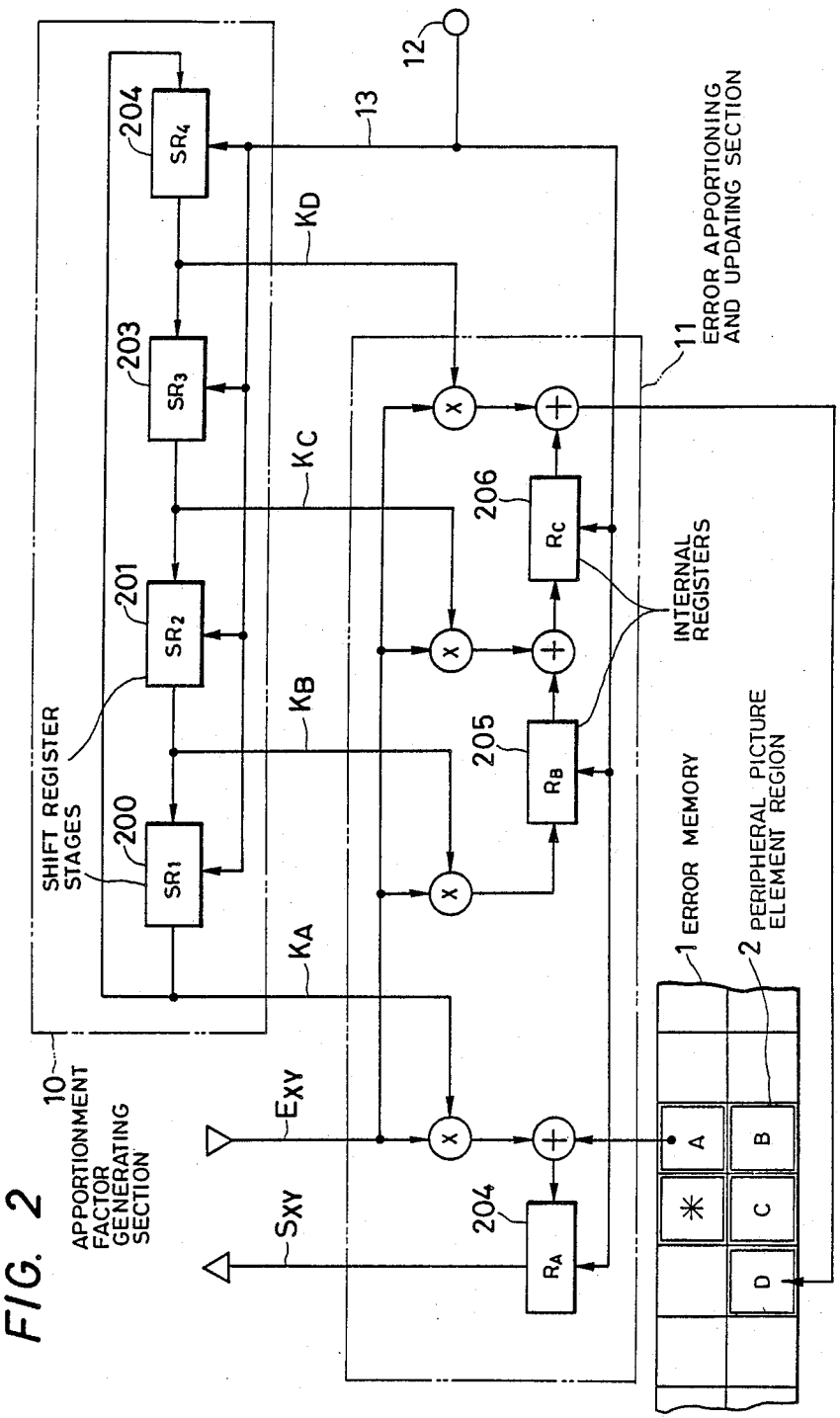
FIGS. 2 through 5 are general circuit diagrams showing essential components of second through fifth embodiments of the invention respectively, illustrating specific configurations for an apportionment factor generating updating section and an error apportioning and updating section.

FIG. 2 shows the configuration of the apportionment factor generating section 10 and the error apportioning and updating section 11 for a second embodiment of the present invention. As shown in FIG. 2, the apportionment factor generating section 10 contains a recirculating shift register consisting of four shift register stages, respectively designated as 200 (SR1) to 203 (SR4). Prior to the commencement of image processing, a set of apportionment factors KA0, KB0, KC0 and KD0 are loaded into the registers 200 to 203 as respective initial values. The x-direction sync signal 13 is applied from an input terminal 12 to each of the registers 200 to 203, to produce recirculation of the stored apportionment factors through these registers in the direction of registers 203, 200, 201, 202. The output data from the registers 200 to 203 are supplied to the error apportioning and updating section 11 as apportionment factors $K_A$ to $K_D$ respectively. In this way, the value of the apportionment factor $K_A$ will change in the sequence KA0, KB0, KC0, KD0, in synchronism with the sync signal from input terminal 13. Similarly the apportionment factor $K_B$ will change in the in the sequence KB0, KC0, KD0, KA0, the apportionment factor $K_C$ will change in the sequence KC0, KD0, KA0, KB0, and the apportionment factor $K_D$ will change in the sequence KD0, KA0, KB0, KC0. The error apportioning and updating section 11 multiplies the apportionment factor $K_A$ by the bi-level conversion error $E_{xy}$ that is inputted from the subtractor 9, and the result is then added to the accumulated error $S'_A$ which corresponds to the picture element position A, (the accumulated error $S'_A$ being read out from the error memory 1) and the result of this is temporarily stored in an internal register 204 (RA) to be utilized as the accumulated error $S_{xy}$ for the next picture element to be processed, in the succeeding picture element processing step. Since the accumulated error for the picture element B is first produced during processing of the object picture element 3, the bi-level conversion error $E_{xy}$ and the apportionment factor $K_B$ are multiplied together and the result is temporarily stored as the accumulated error for the picture element position B, in an internal register 205 (RB). The apportionment factor KC and the bi-level conversion error $E_{xy}$ are multiplied together, and the result is added to an accumulated error which was derived during the immediately preceding picture element processing operation and had been temporarily stored in the internal register 205 (RB), and the result of this addition is then temporarily stored in the internal register 206 (RC), as the accumulated error value for the picture element position C. The apportionment factor KD and the bi-level conversion error $E_{xy}$ are multiplied together, and the result is added to an accumulated error which was derived during the immediately preceding picture element processing operation and had been temporarily stored in the internal register 206 (RC), and the result of this addition is then stored in a position in the error memory 1 which corresponds to the picture element position D, as the updated accumulated error value for the picture element position D.

As a result of this operation of the error apportioning and updating section 11, the only memory accessing which is required for the error memory 1 consists of read-out access corresponding to the picture element A, and write-in access corresponding to the picture element D. Thus, a practical configuration for this embodiment can be easily implemented.

It should be noted that it would be possible to attain results which are close to those obtainable with the above embodiment, if apportionment factor alteration by the apportionment factor generating section 10 were to be executed once in each occurrence of a plurality of successive picture element processing steps, rather than upon each successive processing step (in synchronism with the x-direction sync signal) as in the above embodiment. For example, it would be equally possible to execute shift operation of register stages 200 to 203 in response to the y-direction sync signal, rather than the x-direction sync signal.

With the second embodiment of the invention described above, a plurality of apportionment factors in a set of apportionment factors produced by the apportionment factor generating section 10 are sequentially altered as image processing proceeds, to thereby avoid a condition in which the respective proportions by which a bi-level conversion error of an object picture element is apportioned among a set of peripherally adjacent picture elements are held constant. As a result, the texture which is produced with the prior art error diffusion method is substantially eliminated.

Figure 3:
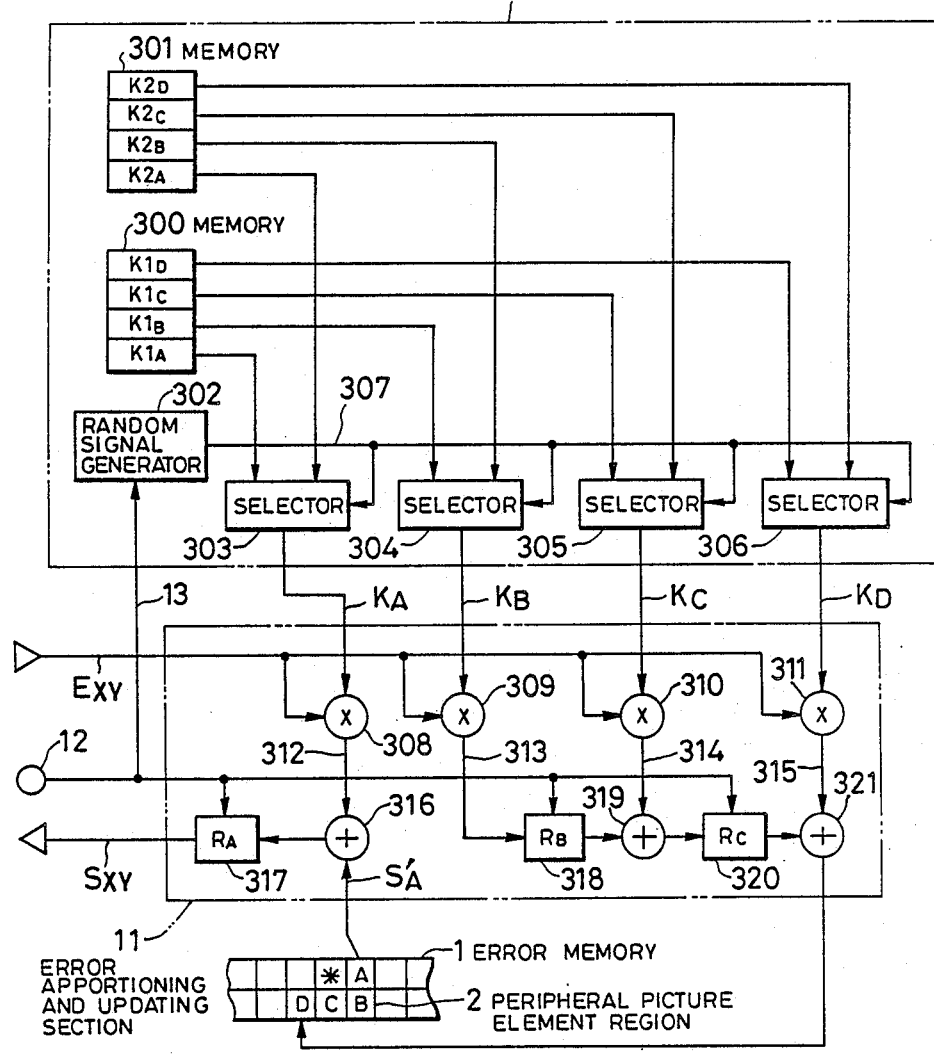

FIG. 3 shows a specific configuration for the error apportioning and updating section 11 and the apportionment factor generating section 10 of a third embodiment of an image signal processing apparatus according to the present invention. As shown in FIG. 3, the apportionment factor generating section 10 contains memories 300 and 301, for respectively storing two sets of apportionment factors $K1_A$ to $K1_D$ and $K2_A$ to $K2_D$. These apportionment factors are stored beforehand in the memories 300 and 301, prior to the commencement of image processing. A selection signal generating circuit 302 receives from a sync signal input terminal 12 an x-direction sync signal 13, and produces as output a selection signal 307 at predetermined image processing intervals. This signal 307 is applied to a set of selectors 302 to 306. The selectors 303 to 306 function to select apportionment factors $K_A$ to $K_D$ (which respectively correspond to the picture element positions A to D of the error memory 1) from the two sets of apportionment factors stored in memories 300 and 301, i.e. apportionment factors ($K1_A$, $K1_B$, $K1_C$ and $K1_D$) and ($K2_A$, $K2_B$, $K2_C$ and $K2_D$). The selection signal generator 302 within the apportionment factor generating section 10 of this embodiment produces a selection signal whereby the two sets of apportionment factors stored in memories 300 and 301 are sequentially selected by the selectors 303 to 306 to be produced as the apportionment factors $K_A$ to $K_D$. However it would equally possible utilize as the selection signal generator 302 a maximum length counter circuit, for examaple, coupled to receive the x-sync signal 13 from input termimal 12, and to thereby execute random, rather than periodic selection of the two sets of apportionment factors in memories 300 and 301, i.e. to generate and apply to the selectors 303 to 306 a selection signal which executes such random selection.

The error apportioning and updating section 11 operates in synchronism with the sync signal 13 to multiply the apportionment factors KA to KD thus produced by the bi-level conversion error $E_{xy}$ that is inputted from the subtractor 9, to thereby obtain a set of error apportionment values 312 to 315.. The error apportionment value 312 is then added to the accumulated error $S'_A$ that corresponds to the picture element position A, (the accumulated error $S'_A$ being read out from the error memory 1) and the result of this is temporarily stored in an internal register 317 (RA) to be utilized as the accumulated error $S_{xy}$ for the next picture element to be processed in the succeeding processing step. The error apportionment value 313 is temporarily stored (without being altered) as the accumulated error SB for the picture element position B, in an internal register 318 (RB). The error apportionment value 314 and data which were derived during the immediately preceding image processing operation and had been temporarily stored in the internal register 318 (RB) are added together, and the result of the addition is then temporarily stored in the internal register 320, as the accumulated error value (SC) for the picture element position C. The error apportionment value 315 is added to data which were derived during the immediately preceding picture element processing operation and temporarily stored in the internal register 320 (RC), and the result of this addition is stored in a memory position in the error memory 1 which corresponds to the picture element position D. In this way, the only memory accessing which is required in the error memory 1 consists of read-out access corresponding to the picture element A, and write-in access corresponding to the picture element D, so that a practical configuration can be easily implemented.

With the third embodiment described above, the image signal processing apparatus includes apportionment factor generating means which function by selecting a single set of apportionment factors from a plurality of predetermined sets of apportionment factors, with the selection being performed in a predetermined sequence or in a random sequence. As a result, the amounts of bi-level conversion error which are apportioned among picture elements disposed peripherally adjacent to an object picture element are prevented form being biased towards particular picture elements which have a fixed mutual positional relationship with the object picture element, whereby an output image produced by processing by the apparatus of the present invention can be kept substantially free from a texture pattern.

Figure 4:
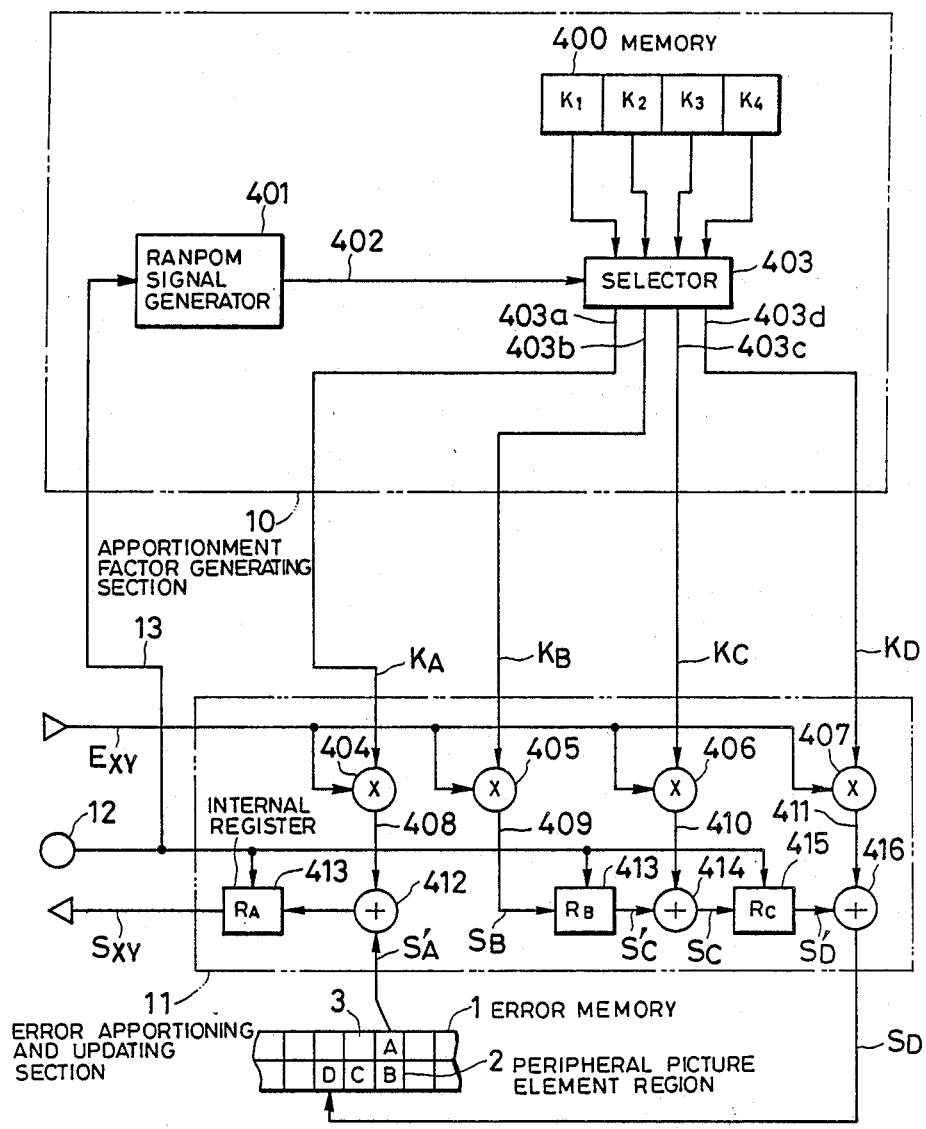

A specific configuration for the error apportioning and updating section 11 and the apportionment factor generating section 10 of a fourth embodiment of an image signal processing apparatus according to the present invention 1 will now be described, referring to FIG. 4. In FIG. 4, a memory 400 is provided within the apportionment factor generating section 10, for storing a single set of apportionment factors K1 to K4. This set of apportionment factors is stored prior to the commencement of image processing. A random signal generator 401 produces a selection signal 402 at periodic timings which are synchronized with the x-direction sync signal 13 supplied from sync signal input terminal 12. The random signal generator 401 can be configured as a maximum length counter circuit, for example. A selector 403 has four output terminals 403a to 403d, and selects respective ones of the stored apportionment factors K1 to K4 to be transferred to the output terminals 403a to 403d, in response to the selection signal 402. The selector 403 thereby performs random selection from the set of apportionment factors K1 to K4 stored in the memory 400, to produce apportionment factors KA to KD' respectively corresponding to the picture elements A to D in the peripherally picture element region 2 adjacent to the object picture element 1. There are 401 possible ways in which the apportionment factors KA to KD can be selected from K1 to K4, i.e. in which KA to KD can be connected as K1 to K4, so that the selection signal 402 is a 4-bit parallel signal.

The error apportioning and updating section 11 operates in synchronism with the sync signal 13 to multiply the apportionment factors KA to KD (supplied from the apportionment factor generating section 10 ) by the bi-level conversion error $E_{xy}$ that is supplied from the subtractor 9, to thereby obtain a set of error apportionment values 408 to 411. This multiplication is executed by a set of multipliers 404 to 407. The error apportionment value 408 is then added (by an adder 412) to the accumulated error $S'_A$ that corresponds to the picture element position A, (the accumulated errors $S'_A$ being read out from the error memory 1) and the result of this is temporarily stored in an internal register 413 (RA) to be utilized as the accumulated error $S_{xy}$ for the next picture element to be processed in the succeeding processing step. The error apportionment value 409 is temporarily stored (without alteration) as the accumulated error SB for the picture element position B, in an internal register 413 (RB). The error apportionment value 409 and data which were derived during the immediately preceding picture element processing operation and temporarily stored in the internal register 413 (RB) are added together (by an adder 414), and the result of the addition is then temporarily stored in the internal register 415, as the accumulated error value (SC) for the picture element position C. The error apportionment value 409 is then added to data which were derived during the immediately preceding picture element processing operation and temporarily stored in the internal register 415 (RC), and the result of this addition is stored in a memory position in the error memory 1 which corresponds to the picture element position D. As for the previously described configurations, a practical configuration for this embodiment can be easily implemented, due to the limited number of memory access operations required.

With the configuration shown in FIG. 4 and described above, as for the two previously described embodiments, a condition is avoided wherein fixed proportions of apportionment of a bi-level conversion error of an object picture element are established among peripherally adjacent picture elements to that object picture element, this condition being avoided due to the use of an apportionment factor generating section which executes random selection from a single predetermined set of apportionment factors of a plurality of apportionment factors respectively corresponding to peripheral picture element positions, with this selection being repetitively executed as image processing proceeds. As a result, a texture pattern which is produced with the prior art error diffusion method is substantially eliminated.

It should also be noted that it would be equally possible to apply a sync signal to the random signal generating circuit 401 such that alteration of the apportionment factors $_A$ to $K_D$ occurs once in each of an arbitrary plurality of successive picture element processing steps, rather than upon each successive processing step (in response to the x-direction sync signal 13) as in the above embodiment.

A specific configuration for the error apportioning and updating section 11 and the apportionment factor generating section 10 of a fifth embodiment of an image signal processing apparatus according to the present invention will now be described, referring to FIG. 5. With this configuration the apportionment factor generating section 10 is provided with two memories 500 and 501, which respectively have apportionment factor sets $K1_A$ to $K1_D$ and $K2_A$ to $K2_D$ stored therein prior to the commencement of processing, i.e. a plurality of sets of apportionment factors are stored beforehand.

An initial value table 502 has initial values stored therein prior to the commencement of image processing, which are used to determine the starting point of random signal generation, which is performed periodically once in a plurality of scanning lines. An initial value 505 is thereby outputted in response to a line sync (i.e. y-direction sync) signal 504 which is applied from a sync signal input terminal 503. The line sync signal 504 is synchronized with the period of processing successive lines of picture elements, as described hereinabove. The initial value table can be configured from a RAM or ROM memory, having stored therein a set of values of successively increasing magnitude, which are read out on successive scanning lines, in response to the line sync signal applied thereto. However it would be equally possible to configure the initial value table as a counter, which counts successive pulses of the line sync signal, so that successive initial values produced thereby are incremented by a predetermined integer once in each occurrence of an arbitrary number of scanning line periods.

The random signal generator 506 periodically generates a random selection signal based on random number generation, in synchronism with the sync signal 13 which is generated in synchronism with an image processing period along the x-direction. The starting point of this random signal generation is periodically set to a new initial value 505 which is produced from the initial value table 502 in response to the line sync signal 504.

The selection signal 507 can be generated for example by utilizing a maximum length counter circuit as the random signal generator 506. The selectors 508 to 511 are responsive to this selection signal 507 for randomly selecting and transferring respective ones of the two sets of apportionment factors stored in the memories 500 and 501, to be outputted from the selectors as the apportionment factors $K_A$ to $K_D$.

The error apportioning and updating section 11 operates in synchronization with the sync signal 13 to multiply the apportionment factors $K_A$ to $K_D$ from the apportionment factor generating section 10 by the bi-level conversion error $E_{xy}$ which is supplied from the subtractor 9, to thereby obtain a set of error apportionment values 516 to 519. This multiplication is executed by a set of multipliers 512 to 515. The error apportionment value 516 is then added by an adder 520 to the accumulated error $S'_A$ that corresponds to the picture element position A, (the accumulated error $S'_A$ being read out from the error memory 1) and the result of this is temporarily stored in an internal register 521 (RA) to be utilized as the accumulated error $S_{xy}$ for the next picture element to be processed in the succeeding processing step. The error apportionment value 517 is temporarily stored as the accumulated error SB for the picture element position B, in an internal register 522 (RB). The error apportionment value 518 and data which had been temporarily stored in the internal register 24 (RB) are added together by an adder 523, and the result is then temporarily stored in the internal register 524, as the accumulated error value (SC) for the picture element position C. The error apportionment value 519 is added by an adder 525 to data which had been temporarily stored in the internal register 524 (RC), and the result is stored in a memory position in the error memory 1 which corresponds to the picture element position D.

Figure 5:
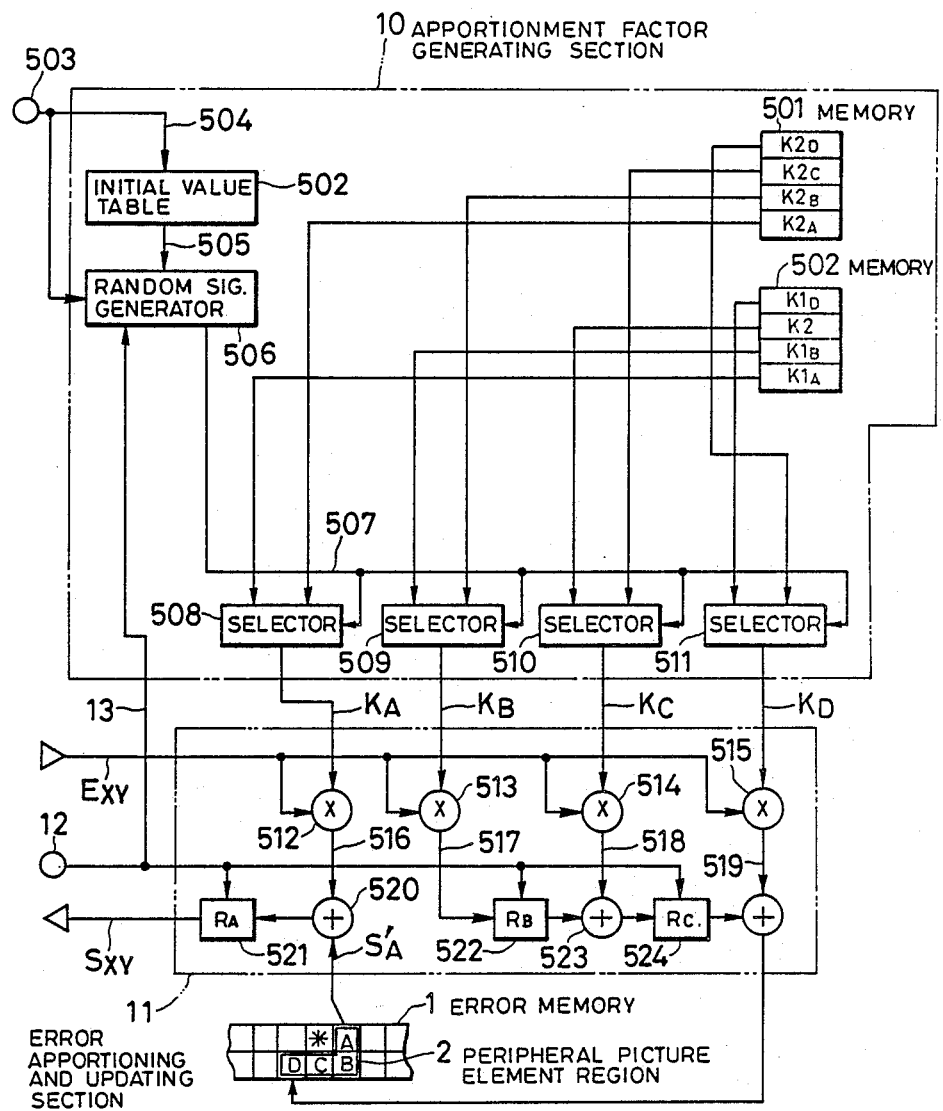

With the configuration of FIG. 5 described above, as for the previously described embodiments, a condition is avoided whereby the respective proportions of apportionment of a bi-level conversion error of an object picture element among a set of peripherally adjacent picture elements are held constant. This is achieved by random selection of apportionment factors from a plurality of sets of apportionment factors, as image processing proceeds. Elimination of a texture pattern is thereby achieved, as for these previous embodiments.

Furthermore, due to the fact that the starting point of random signal generation (i.e. based on generation of successive random numbers) is newly established periodically, once in each occurrence of an arbitrary number of successive scanning lines, texture is effectively suppressed irrespective of the number of picture elements which exist along the x-direction.

It will be apparent from the above that each of the second through fifth embodiments differs from the first embodiment of FIG. 1 with respect to the manner in which accumulated errors are stored. With the embodiment of FIG. 1, all of the accumulated errors are stored in the error memory 1, so that a substantial number of memory read and write access operations with respect to the error memory 1 must be executed during each picture element processing step. However with the embodiments of FIGS. 2 to 5, three internal registers of the error apportioning and updating section 11 are utilized for temporary storage of accumulated errors with the accumulated error $S_{xy}$ for an object picture element being produced from one of these registers (i.e. RA) at the start of a picture element processing step. Thus, the operation and configuration of the error memory 1 can be made more simple, with the embodiments of FIGS. 2 to 5, due to the reduced number of memory accesses which are necessary during each processing step. In spite of these differences, the basic operation of accumulated error generation is substantially identical for all of the embodiments, and the embodiments of FIGS. 2 to 5 can be considered (with respect to the configuration and operation of the error apportioning and updating section 11 and error memory 1) as modifications of the embodiment of FIG. 1, with error memory means in these embodiments being constituted by the set of registers RA to RC in conjunction with the error memory 1, whereas the error memory means of the first embodiment is entirely constituted by the error memory 1.

Although the present invention has been described in the above with reference to specific embodiments, it should be noted that various changes and modifications to these may be envisaged. For example, any of the apportionment factor generating sections of the embodiments of FIGS. 2 through 5 can be utilized as the apportionment factor generating section of the embodiment of FIG. 1.

What is claimed is:

1. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means having a plurality of apportionment factors stored therein, for generating a set of apportionment factors by selection from among said stored plurality of factors; and error apportionment and updating means for computing respective error apportionment values corresponding to said adjacent picture elements, based on said bi-level conversion error for said object picture element, and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means.

2. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors, said apportionment factor generating means functioning to store a single set of apportionment factors and to generate said plurality of apportionment factors by establishing and periodically altering respective correspondences between positions of said adjacent picture elements and respective coefficients of said set of apportionment factors, the alterations being executed with a fixed period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means.

3. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors, said apportionment factor generating means functioning to store a single set of apportionment factors and to generate said plurality of apportionment factors by establishing and periodically altering respective correspondences between positions of said adjacent picture elements and respective coefficients of said set of apportionment factors, the alterations being executed with a fixed period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means;

in which said apportionment factor generating means (10) comprises a recirculating shift register having a number of stages corresponding to said set of apportionment factors and responsive to a periodically generated shift signal for executing shift operations, said apportionment factors being respectively held in and periodically shifted through said shift register stages and said apportionment factors being generated as outputs from said shift register stages.

4. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors by selection from a plurality of sets of apportionment factors, said selection being executed periodically by said apportionment factor generating means with a fixed alteration period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means.

5. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bilevel value as said bi-level image signal;

difference computation means for deriving a bi-level conversion error which is the difference between said corrected level and said bi-level value determined for the object picture element;

apportionment factor generating means for generating a plurality of apportionment factors by selection from a plurality of sets of apportionment factors, said selection being executed periodically by said apportionment factor generating means with a fixed alteration period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means;

in which said apportionment factor generating means (10) comprises:

a plurality of memory means (300, 301) having stored therein respective sets of apportionment factor values;

selection signal generating means (302) for generating a selection signal (307) in accordance with a synchronization signal; and a plurality of selector elements, responsive to said selection signal for sequentially selecting respective ones of said sets of apportionment factors stored in said memory means to be produced as said apportionment factors ($K_A$ to $K_D$) for apportioning said bi-level conversion error among said peripherally adjacent picture elements.

6. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors by selection from a plurality of sets of apportionment factors, said selection being executed randomly with a fixed alteration period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means.

7. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bilevel value as said bi-level image signal;

difference computation means for deriving a bi-level conversion error which is the difference between said corrected level and said bi-level value determined for the object picture element;

apportionment factor generating means for generating a plurality of apportionment factors by selection from a plurality of sets of apportionment factors, said selection being executed randomly with a fixed alteration period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means;

in which said apportionment factor generating means (10) comprises:

a plurality of memory means (300, 301) having stored therein respective sets of apportionment factors;

selection signal generating means (302) for generating a selection signal (307) in accordance with a synchronization signal, for random selection of the contents of said plurality of memory means; and a plurality of selector means (303 to 306) responsive to said selection signal for randomly selecting respective ones of said sets of apportionment factors stored in said plurality of memory means to be produced as said plurality of apportionment factors ($K_A$ to $K_D$).

8. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level image signal;

difference computation means for deriving a bi-level conversion error which is the difference between said corrected level and said bi-level value determined for the object picture element;

apportionment factor generating means for generating a plurality of apportionment factors by selection from a plurality of sets of apportionment factors, said selection being executed randomly with a fixed alteration period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means;

in which said apportionment factor generating means (10) comprises:

a plurality of memory means (300, 301) having stored therein respective sets of apportionment factors;

selection signal generating means (302) for generating a selection signal (307) in accordance with a synchronization signal, for random selection of the contents of said plurality of memory means; and a plurality of selector means (303 to 306) responsive to said selection signal for randomly selecting respective ones of said sets of apportionment factors stored in said plurality of memory means to be produced as said plurality of apportionment factors ($K_A$ to $K_D$);

and in which said selection signal generating means (302) comprises a maximum length counter circuit.

9. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors for apportioning said bi-level error among corresponding ones of said adjacent picture elements, said apportionment factors being generated by randomly selecting respective ones of a set of apportionment factors to be established in correspondence with said adjacent picture elements, said random selection being executed periodically with a fixed alteration period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means.

10. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors for apportioning said bi-level error among corresponding ones of said adjacent picture elements, said apportionment factors being generated by randomly selecting respective ones of a set of apportionment factors to be established in correspondence with said adjacent picture elements, said random selection being executed periodically with a fixed alteration period; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at storage positions respectively corresponding to said adjacent picture elements, to thereby obtain updated accumulated errors, and storing said updated accumulated errors in said error memory means;

in which said apportionment factor generating means (10) comprises:

memory means (400) having stored therein said set of apportionment factors (K1 to K4);

random signal generating means (401) for generating a selection signal (402); and selector means (403) coupled to receive said apportionment factors and responsive to said selection signal for randomly altering respective output positions of said selector means to which respective ones of said stored apportionment factors are transferred, said plurality of apportionment factors for apportioning said bi-level error being thereby produced as outputs from said selector means.

11. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors for apportioning said bi-level error among said adjacent picture elements, said plurality of apportionment factors being generated by selection from a plurality of sets of apportionment factors, said selection being performed periodically with a fixed period of alteration and in accordance with random number generation which is initiated from an arbitrary initial value once in each of an arbitrary number of successive ones of said scanning lines; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at fixed storage positions respectively corresponding to said adjacent picture elements, to thereby obtain updated accumulated errors, and storing said updated accumulated errors in said error memory means.

12. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors for apportioning said bi-level error among said adjacent picture elements, said plurality of apportionment factors being generated by selection from a plurality of sets of apportionment factors, said selection being performed periodically with a fixed period of alteration and in accordance with random number generation which is initiated from an arbitrary initial value once in each of an arbitrary number of successive ones of said scanning lines; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at fixed storage positions respectively corresponding to said adjacent picture elements, to thereby obtain updated accumulated errors, and storing said updated accumulated errors in said error memory means;

in which said arbitrary initial value is a value which is incremented by a fixed integer once in each of an arbitrary number of successive ones of said scanning lines.

13. An image signal processing apparatus for sampling an input signal representing a continuous tone image, in units of picture elements, to sequentially process the picture elements to produce a bi-level image signal, the apparatus comprising:

error memory means for storing accumulated errors at storage positions respectively corresponding to positions in said image of an object picture element and a plurality of picture elements which are positioned adjacent to the object picture element in said image;

input correction means for adding a level of said input signal, representing the density of said object picture element in said image, to an accumulated error which has been stored during a preceding processing step at said position within the error memory means corresponding to said object picture element, to derive a corrected level as a result of the addition;

bi-level conversion means for comparing said corrected level with a fixed threshold value to thereby determine a bi-level value for said object picture element, and for producing said bi-level value as said bi-level image signal;

difference computation means for deriving a bi-level conversion error which is the difference between said corrected level and said bi-level value determined for the object picture element;

apportionment factor generating means for generating a plurality of apportionment factors for apportioning said bi-level error among said adjacent picture elements, said plurality of apportionment factors being generated by selection from a plurality of sets of apportionment factors, said selection being performed periodically with a fixed period of alteration and in accordance with random number generation which is initiated from an arbitrary initial value once in each of an arbitrary number of successive ones of said scanning lines; and error apportionment and updating means for computing respective error apportionment values corresponding to said adjacent picture elements, based on said bi-level conversion error for said object picture element and said plurality of apportionment factors, adding said error apportionment values to corresponding accumulated errors which have been previously stored in said error memory means at fixed storage positions respectively corresponding to said adjacent picture elements, to thereby obtain updated accumulated errors, and storing said updated accumulated errors in said error memory means;

in which said arbitrary initial value is a value which is incremented by a fixed integer once in each of an arbitrary number of successive ones of said scanning lines, and in which said apportionment factor generating means (10) comprises:

a plurality of memory means (500, 501) having stored therein respective predetermined sets of apportionment factors ($K1_A$ to $K1_D$), ($K2_A$ to $K2_D$);

an initial value table (502) containing initial values;

random signal generating means (506) coupled to receive an initial value from said initial value table once in each of an arbitrary number of said scanning lines, and to receive a periodically generated sync signal, for generating a selection signal based on random number generation which is initiated from said initial value; and a plurality of selector means (508 to 511) responsive to said selection signal for selectively coupling output terminals thereof to receive respective ones of said sets of stored apportionment factors, for thereby producing from said output terminals said apportionment factors for apportioning said bi-level error among corresponding ones of said plurality of adjacent picture elements.

* * * * *